(12) United States Patent
Mukai

(10) Patent No.: US 10,029,518 B2
(45) Date of Patent: Jul. 24, 2018

(54) PNEUMATIC TIRE

(71) Applicant: Sumitomo Rubber Industries, Ltd., Kobe-shi, Hyogo (JP)

(72) Inventor: Tomoyuki Mukai, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 684 days.

(21) Appl. No.: 14/337,597

(22) Filed: Jul. 22, 2014

(65) Prior Publication Data

US 2015/0041037 A1  Feb. 12, 2015

(30) Foreign Application Priority Data

Aug. 9, 2013  (JP) .................................. 2013-166790

(51) Int. Cl.
*B60C 13/02* (2006.01)
*B60C 13/00* (2006.01)

(52) U.S. Cl.
CPC ............ B60C 13/02 (2013.01); B60C 13/001 (2013.01)

(58) Field of Classification Search
CPC ............................... B60C 13/001; B60C 13/02
USPC ....................................................... D12/605
See application file for complete search history.

(56) References Cited

U.S. PATENT DOCUMENTS

| | | | | |
|---|---|---|---|---|
| 5,303,758 A | * | 4/1994 | Clementz | B60C 13/001 |
| | | | | 152/523 |
| 5,728,242 A | * | 3/1998 | Barrese | B60C 13/02 |
| | | | | 152/523 |
| 5,807,446 A | * | 9/1998 | Ratliff, Jr. | B60C 13/02 |
| | | | | 152/523 |
| D552,537 S | * | 10/2007 | Franks | D12/605 |
| D608,275 S | * | 1/2010 | Maxwell | D12/605 |
| 2003/0084979 A1 | | 5/2003 | Matsumoto | |
| 2010/0018624 A1 | * | 1/2010 | Miyasaka | B60C 13/001 |
| | | | | 152/523 |

(Continued)

FOREIGN PATENT DOCUMENTS

| | | | |
|---|---|---|---|
| EP | 2255979 | * | 12/2010 |
| JP | 07-164831 | * | 6/1995 |

(Continued)

OTHER PUBLICATIONS

English machine translation of JP2001-191745, no date.*
English machine translation of JP07-164831, no date.*
English machine translation of JP2012-188037, dated Oct. 2012.*

*Primary Examiner* — Robert C Dye
(74) *Attorney, Agent, or Firm* — Birch, Stewart, Kolasch & Birch, LLP

(57) ABSTRACT

A pneumatic tire comprises a sidewall portion provided in the outer surface with a serrated area defined by radially-extending circumferentially-arranged ridges. The serrated area has circumferentially-arranged groups each including: at least one first ridge being straight over the entire length; and a plurality of second ridges, circumferentially arranged side-by-side, and each provided with an irregular part and otherwise being straight. In each of the ridge groups, the irregular parts of the second ridges are gradually radially shifted so that the irregular parts are arranged along a line inclined with respect to a tire radial direction, and by the irregular parts, an oblique pattern is formed in the ridge group.

13 Claims, 8 Drawing Sheets

(56) References Cited

U.S. PATENT DOCUMENTS

2011/0139326 A1* 6/2011 Nukushina ......... B29D 30/0606
152/523

FOREIGN PATENT DOCUMENTS

| JP | 2001-191745 | * | 7/2001 |
| JP | 2009-143488 A | | 7/2009 |
| JP | 2012-188037 | * | 10/2012 |

* cited by examiner

PNEUMATIC TIRE

BACKGROUND OF THE INVENTION

The present invention relates to a pneumatic tire having a sidewall portion provided in the outer surface thereof with a serrated area.

In a tire manufacturing method in which a carcass ply strip is wound around a tire drum or former, usually the circumferential ends or edges of such carcass ply strip are overlap jointed. Thus, such an overlap joint extends from the bead to bead through the tread portion and sidewall portions. Therefore, when the tire is vulcanized, due to a high pressure applied to the inside of the tire, there is a possibility that the overlap joint forms a radially extending bulge or dent in the outer surface of the sidewall portion.

In order to make such unwanted bulge/dent unnoticeable, there has been utilized a serrated area (b) formed in the outer surface of the sidewall portion shown in FIG. 8.

The conventional serrated area (b) is formed by radial ridges (a) extending in parallel with radial directions of the tire (patent document 1) or oblique ridges inclined with respect to radial directions at a constant angle (patent document 2).

[patent document 1] Japanese Patent Application Publication No. 2009-143488
[patent document 2] Japanese Patent Application Publication No. 2003-182317

In such a conventional serrated area (b), the serration pattern becomes monotonous or uniform. This is helpful for increasing the visibility of marks (shown in FIG. 8 as white circles) provided in the serrated area (b). But, there is a possibility to rather emphasis the appearance of the bulge/dent, in particular when the sidewall rubber thickness is small.

SUMMARY OF THE INVENTION

It is therefore, an object of the present invention to provide a pneumatic tire provided in the sidewall portion with a serrated area capable of effectively making a bulge/dent unnoticeable.

According to the present invention, a pneumatic tire comprises
a sidewall portion provided in the outer surface thereof with a serrated area defined by radially-extending circumferentially-arranged ridges, wherein
the serrated area has circumferentially-arranged groups each including one first ridge or a plurality of first ridges circumferentially arranged side-by-side, each being straight over the entire length, and a plurality of second ridges, circumferentially arranged side-by-side, and each provided with an irregular part and otherwise being straight, and
in each of the ridge groups, the irregular parts of the second ridges are gradually radially shifted so that the irregular parts are arranged along a line inclined with respect to a tire radial direction, and the irregular parts form an oblique pattern in the ridge group.

According to the present invention, therefore, the serration pattern of the serrated area is provided with variations by the oblique patterns and exerts an excellent effect to make a bulge/dent unnoticeable without sacrificing the visibility of a mark disposed in the serrated area. Thus, the external appearance quality of the tire can be improved.

DESCRIPTION OF THE PREFERRED EMBODIMENTS

Figure 1:
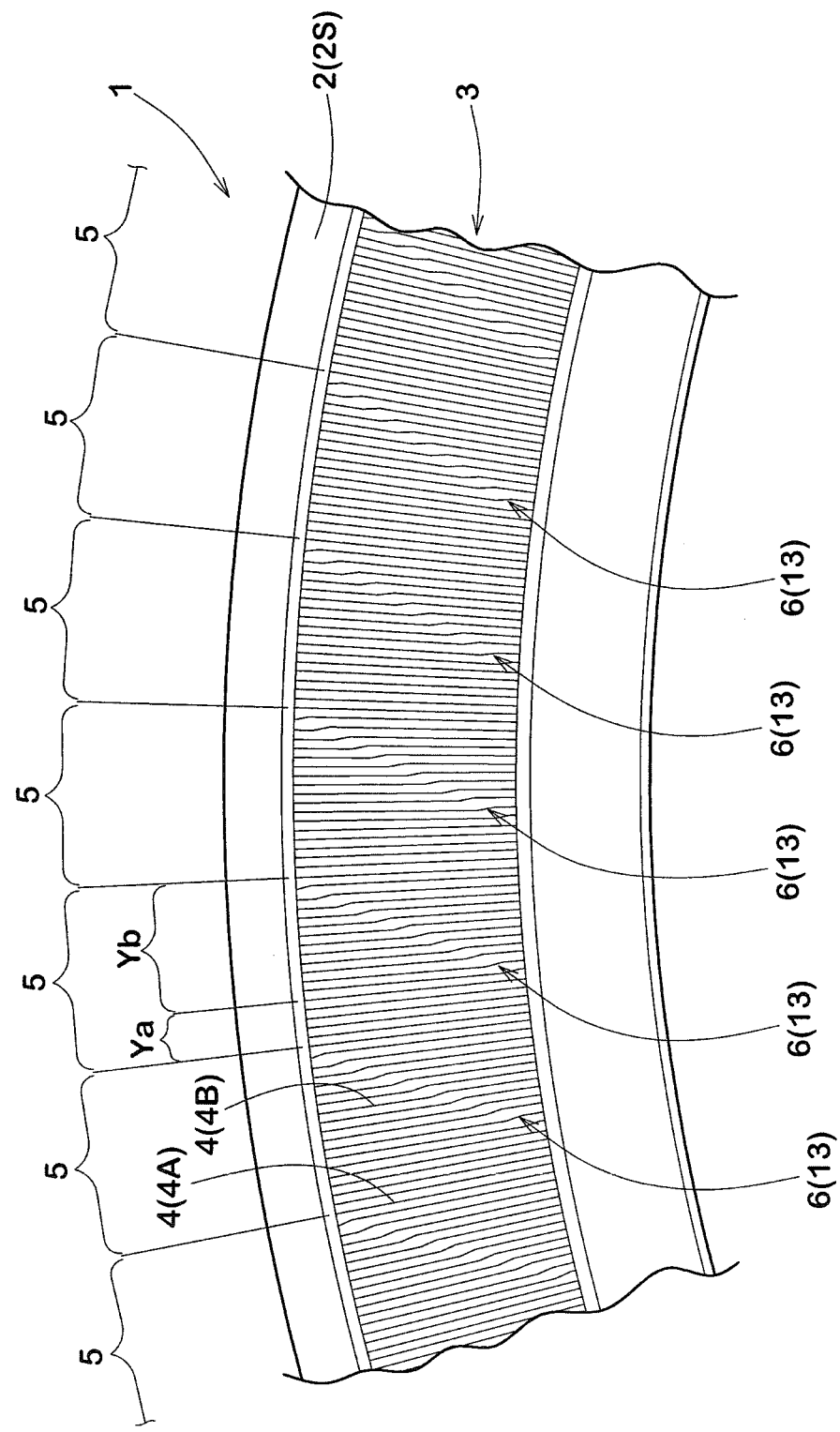
FIG. 1 is a partial side view of a pneumatic tire as an embodiment of the present invention.

Embodiments of present invention will now be described in detail in conjunction with the accompanying drawings.

As well known in the tire art, a pneumatic tire comprises a tread portion whose outer surface defines the tread, a pair of axially spaced bead portions mounted on bead seats of a wheel rim, a pair of sidewall portions extending between the tread edges and the bead portions, a carcass extending between the bead portions through the tread portion and the sidewall portions, and a tread reinforcing belt disposed radially outside the carcass in the tread portion.

The pneumatic tire 1 according to the present invention comprises sidewall portions 2 at least one of which is provided in the outer surface 2S thereof with a serrated area 3 extending continuously (namely, annularly) or discontinuously in the tire circumferential direction.

In the following embodiments, the serrated area 3 is formed continuously around the tire rotational axis.

In the case of the discontinuous serrated area 3, one or more serrated areas 3 can be arranged around the tire rotational axis, while providing a space between the circumferential ends thereof.

The serrated area 3 is defined by a number of ridged 4 extending generally in the tire radial direction and circumferentially arranged in a side-by-side manner at the undermentioned circumferential pitches P.

Figure 2:
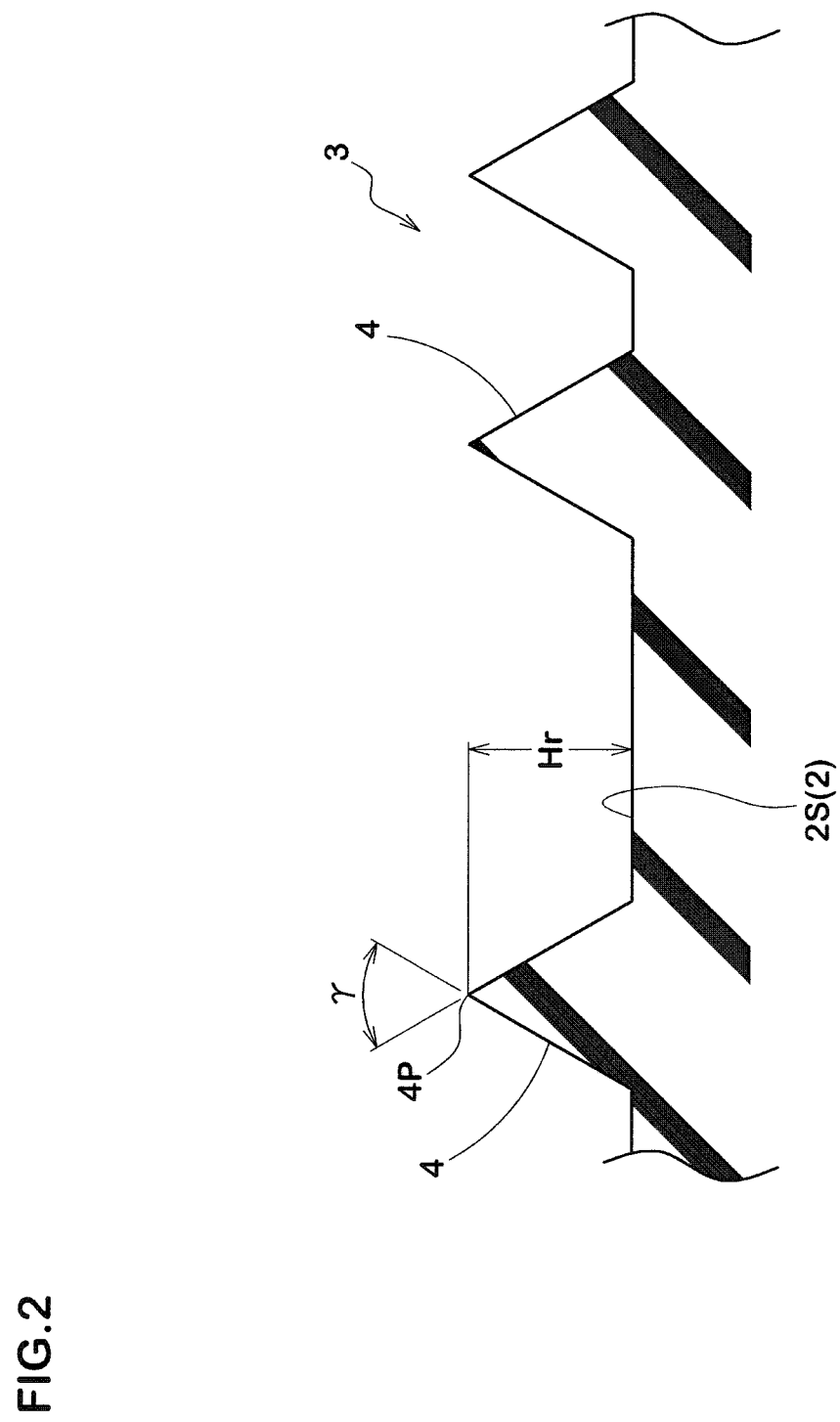
FIG. 2 is an enlarged cross sectional view showing an example of the cross sectional shape of the ridges.

FIG. 2 shows an example of the cross sectional shape of the ridges 4.

In this example, the ridges 4 have an identical cross-sectional shape.

For example, an isosceles triangle whose apex angle γ is about 50 degrees to about 90 degrees is preferably used as such cross-sectional shape. However, various shapes, for example, an inequilateral triangle, a trapezoid and the like can be used as needed.

The ridges 4 can be formed so as to protrude from the outer surface 2S of the sidewall portion 2 by a small protruding height Hr.

Aside from such ridges 4 protruding from the outer surface 2S, as a result of forming small grooves in the outer surface 2S, portions formed between the small grooves and protruding from the groove bottoms can be used as the ridges 4 in another example. In this case, the top 4P of the ridge 4 becomes at the same level as the outer surface 2S.

In any case, the protruding height Hr of the ridges 4 is set in a range of from 0.2 to 0.6 mm for example. The height Hr is however not to be limited to this range.

Incidentally, in FIGS. 1, 3 to 7, the ridges 4 are indicated by their ridge line 4P only as a matter of practical convenience.

The serrated area 3 has ridge groups 5 arranged in the tire circumferential direction.

Each of the ridge groups 5 consists of a plurality of the ridges 4 which are at least one first ridge 4A and a plurality of second ridges 4B.

The first ridge 4A is a straight ridge 10 extending straight substantially in a tire radial direction.

The second ridge 4B is generally straight, but an irregular part 6 is formed in the course of its length.

As the irregular part 6, suitably used is an interruption 6a of a straight ridge, or a bent part 6b (the remaining part is generally straight) of a bent ridge 11.

If the ridge group 5 includes two or more first ridges 4A, all the first ridges 4A are arranged so as to form a first serration section Ya in which all the first ridges 4A are arranged adjacently to each other or in a side-by-side manner.

In each ridge group 5, all the second ridges 4B are arranged so as to form a second serration section Yb in which all the second ridges 4B are circumferentially arranged adjacently to each other or in a side-by-side manner.

Figure 7:
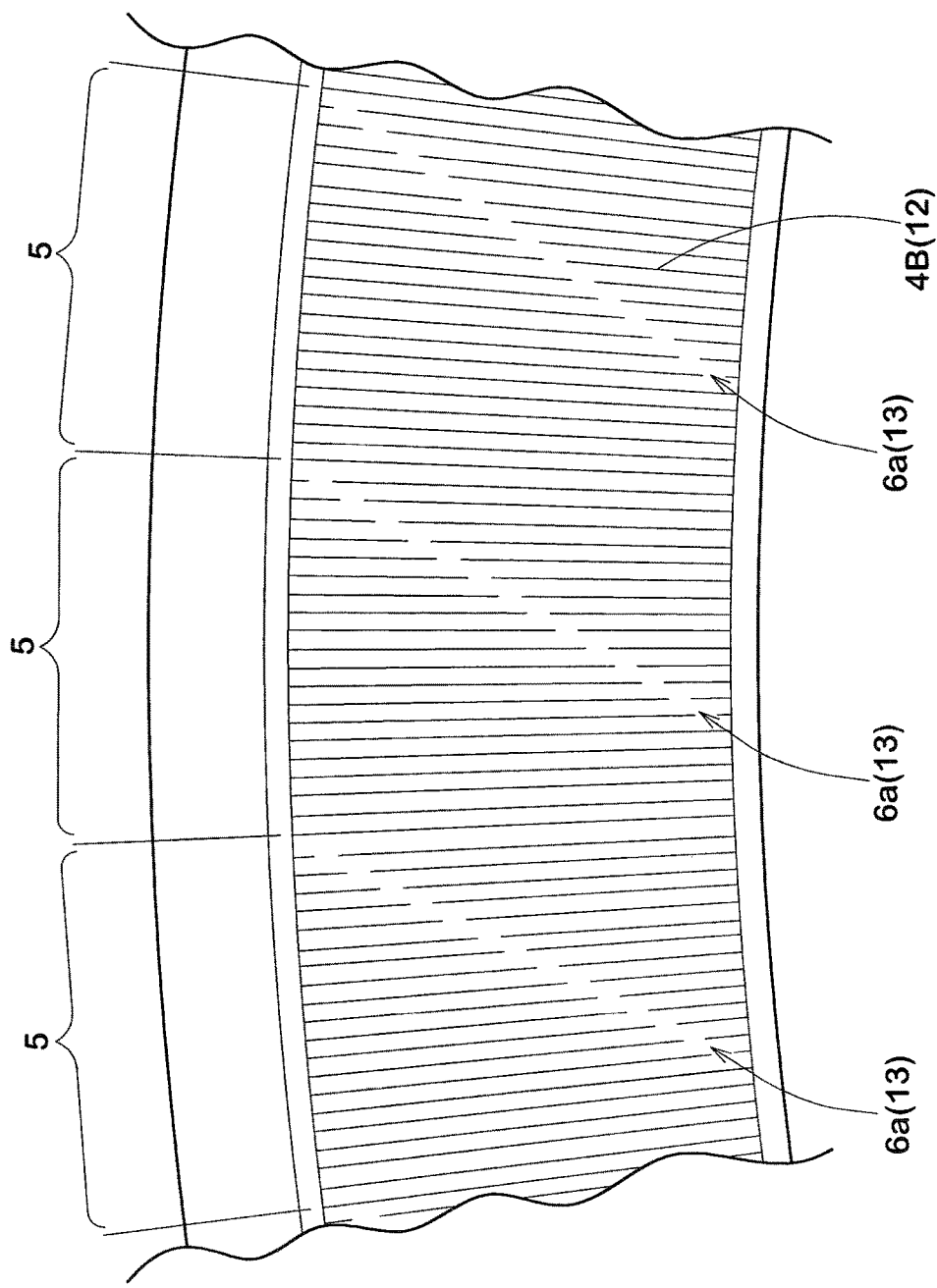
FIG. 7 is a partial side view of a pneumatic tire as another embodiment of the present invention.

In each of the embodiment shown in FIG. 1 in which the irregular parts 6 are the bent parts 6b, and the embodiment shown in FIG. 7 in which the irregular parts 6 are the interruptions 6a, the ridge groups 5 are identical. In such a case, one ridge group 5 can be considered as one unit pattern in a repetition pattern.

Figure 4:
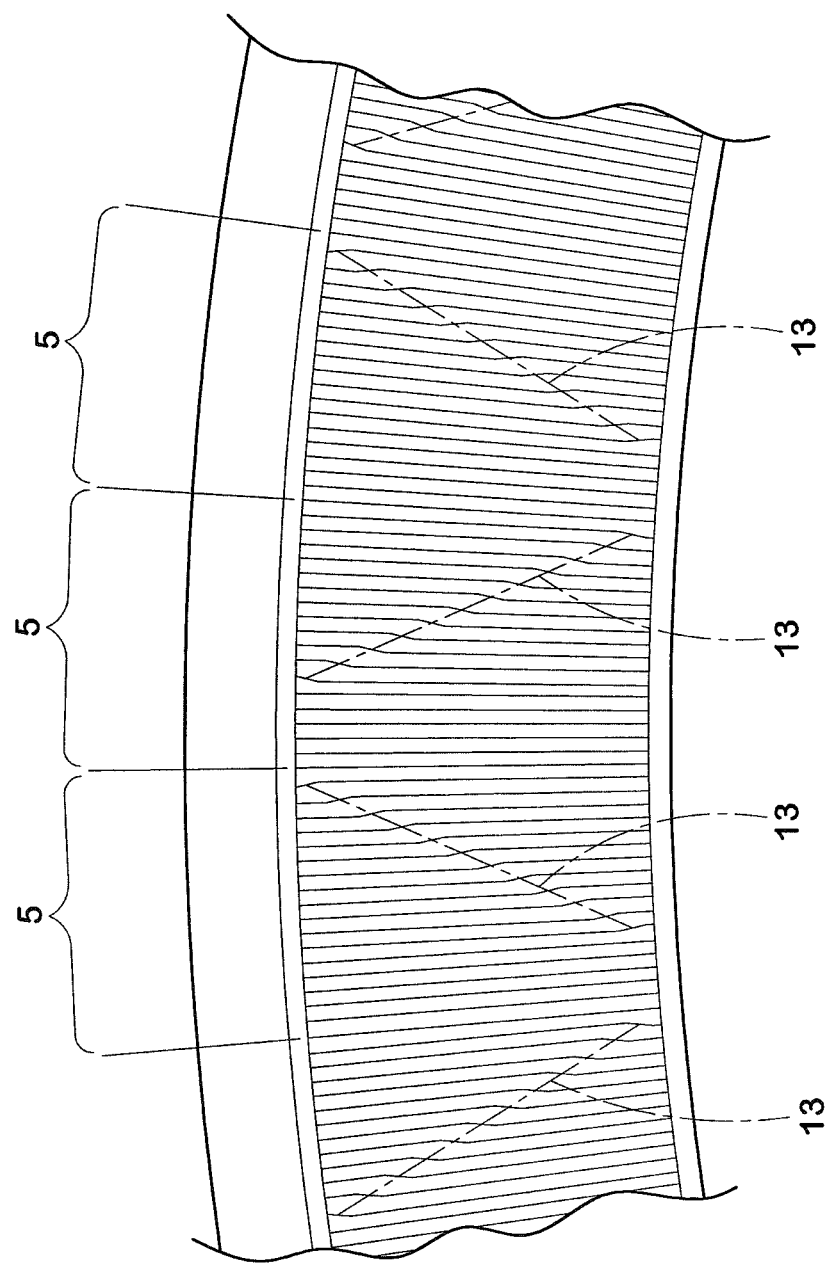
FIG. 4 shows another arrangement of the ridge groups as another embodiment of the present invention.

In the embodiment shown in FIG. 4, two kinds of ridge groups 5 are arranged alternately in the tire circumferential direction. In this particular example, one kind of the ridge group 5 is considered as mirror image of other kind of the ridge group 5.

In any case, each ridge group 5 is defined as being made up of one first serration section Ya and one second serration section Yb.

In the case that the irregular part 6 is the bent part 6b, the second ridge 4B is a bent ridge 11.

Figure 3A:
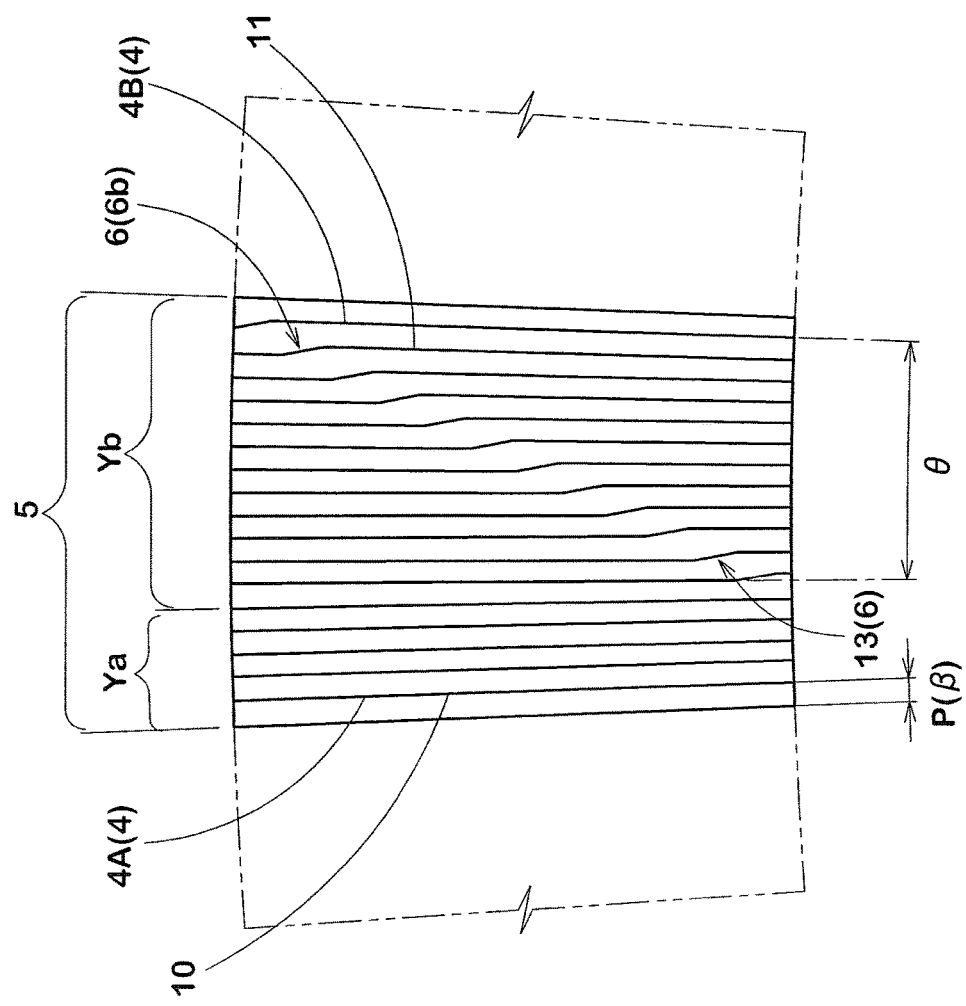
FIG. 3(A) shows an example of the arrangement of the ridges in one ridge group.
Figure 3B:
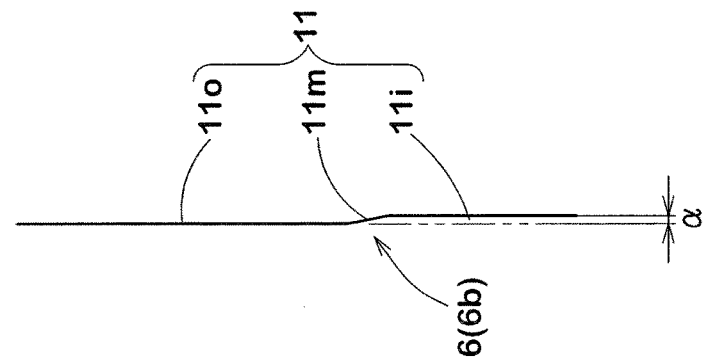
FIG. 3(B) shows an example of a bent ridge.

FIG. 3(B) shows a type of the bent ridge 11 which is made up of a radially inner part 11i, a radially outer part 11o and a bent part 11m connecting therebetween. These parts are straight. The inner part 11i and outer part 11o are substantially parallel each other, and the bent part 11m is inclined thereto, therefore, it has a z-shaped configuration. when the second ridges 4B are the bent ridges 11, most of the second ridge 4B are this type.

However, as shown in FIG. 3(A), the circumferentially outermost two bent ridges 11 in the second serration section Yb as the second ridges 4B may be a type of the bent ridge 11 made up of a bent part 11m and a radially outer part 11o, and a type of the bent ridge 11 made up of a bent part 11m and a radially inner part 11i.

In the case of the bent ridge 11, it is preferable that the angular distance α between the radially inner part 11i and the radially outer part 11o or between both the ends of the bent part 11m, around the tire rotational axis is set in a range of not more than 0.5 degrees in the side view of the tire.

In the case that the irregular part 6 is the interruption 6a, as shown in FIG. 7, the second ridge 4B can be considered as a straight ridge 12 if the interruption 6a is ignored.

In either case, in the second serration section Yb, the irregular parts 6 gradually radially shift toward one circumferential direction so that the irregular parts 6 are arranged on a line (usually substantially straight line) inclined with respect to a tire radial direction and such irregular parts 6 form an oblique pattern 13 in the ridge group 5.

As described above, since the serrated area 3 is provided in the ridge groups 5 with the oblique patterns 13 formed by the irregular parts 6, the serration pattern is provided with variations, therefore, an effect to make the bulge/dent unnoticeable can be provided without affecting the visibility of the mark. Thus, the external appearance quality of the tire can be improved. Further, since the ridges 4 are formed generally straight in the radial direction, the designing and making of the mold are easy. Furthermore, it is possible to maintain a high resistance to adhesion of dirt between the ridge 4.

As shown in FIG. 1 and FIG. 7, the oblique patterns 13 of all the ridge groups 5 can be inclined in the same direction with respect to the respective ridge groups 5 (for example, with respect to its radially extending center line). Here, the same direction does not mean the absolutely same direction because the ridge groups 5 are arranged around the tire rotational axis.

However, the inclining directions of the oblique patterns 13 with respect to the respective ridge groups 5 can be changed.

FIG. 4 shows an example of such change in the inclining directions. In this example, the inclining directions are opposite between the circumferentially adjacent ridge groups 5 so as to further improve the effect to make the bulge/dent unnoticeable.

In any case, it is preferable that the number (na) of the first ridge(s) 4A and the number (nb) of the second ridges 4B in each ridge group 5 are in a range of 1 to 15 and a range of 5 to 25, respectively.

If the number (nb) becomes less than 5, the inclination of the oblique pattern 13 becomes close to the tire radial direction. If the number (nb) becomes more than 25, the inclination of the oblique pattern 13 becomes close to the tire circumferential direction. In either case, the serration pattern can not be effectively variegated, therefore, the effect to make the bulge/dent unnoticeable can not be obtained. If the number (na) becomes more than 15, the distance between the oblique patterns 13 increases, and the effect to make the bulge/dent unnoticeable can not be improved.

For similar reasons, it is preferable that, in each ridge group 5, the circumferentially outermost two of the second ridges 4B are spaced apart from each other by an angular distance θ around the tire rotational axis of not more than 5 degrees.

If the angular distance θ becomes more than 5 degrees, the inclination of the oblique pattern 13 becomes close to the tire circumferential direction, and the effect to make the bulge/dent unnoticeable can not be obtained.

It is preferable that, in each ridge group 5, the arrangement pitches P of the ridges 4 are in a range of from 0.2 to 0.5 degrees when expressed by angular pitches β around the tire rotational axis.

If the arrangement pitches P are less than 0.2 degrees, the serration becomes too dense and the serrated area becomes dark. If the arrangement pitches P are more than 0.5 degrees, the serration becomes too sparse and the serrated area becomes light. In either case, the contrast of the serration pattern is decreased, and the effect to make the bulge/dent unnoticeable can not be improved.

It is preferable that the above-mentioned angular distance α is set to be less than the angular pitches β.

Figure 5:
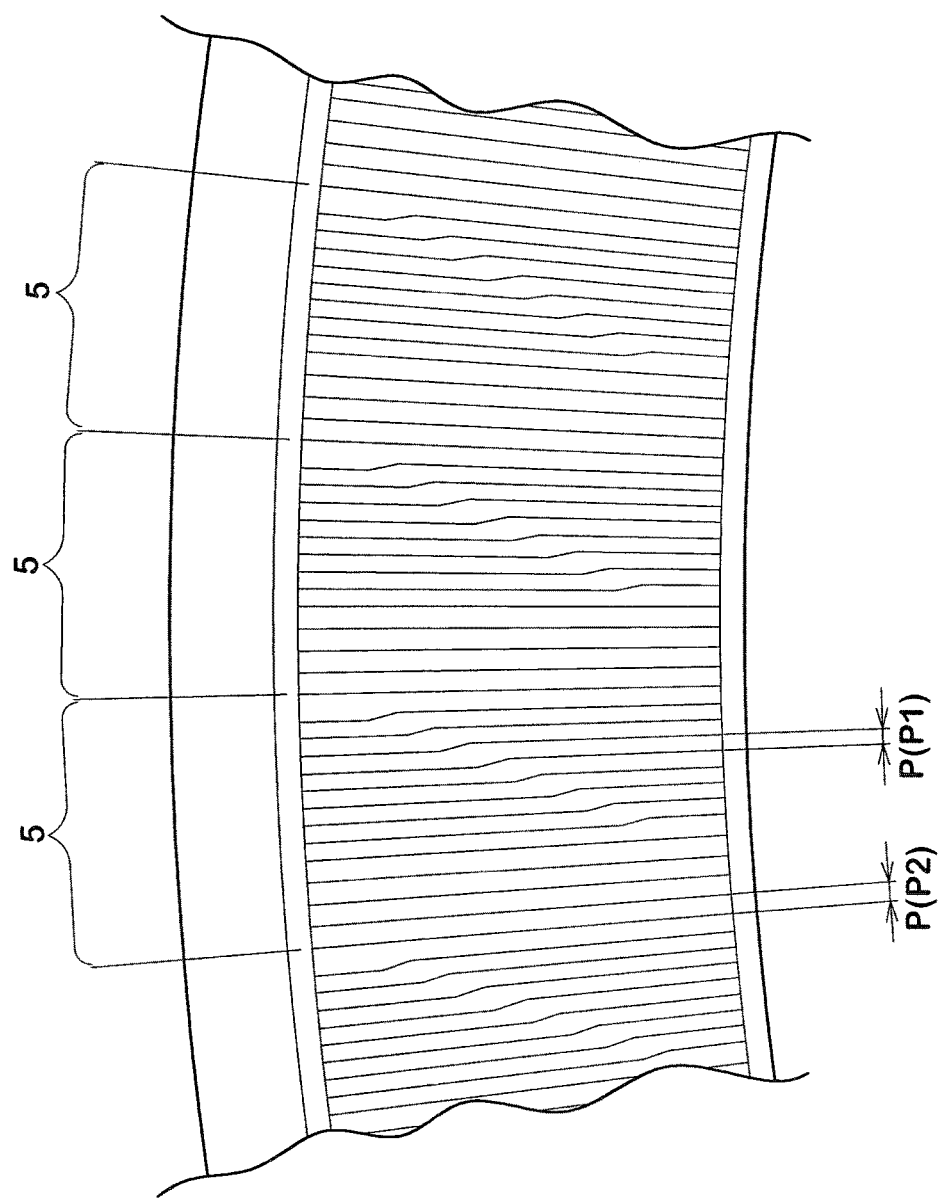
FIG. 5 shows an example of the arrangement pitch variation of the ridges in a ridge group.
Figure 6:
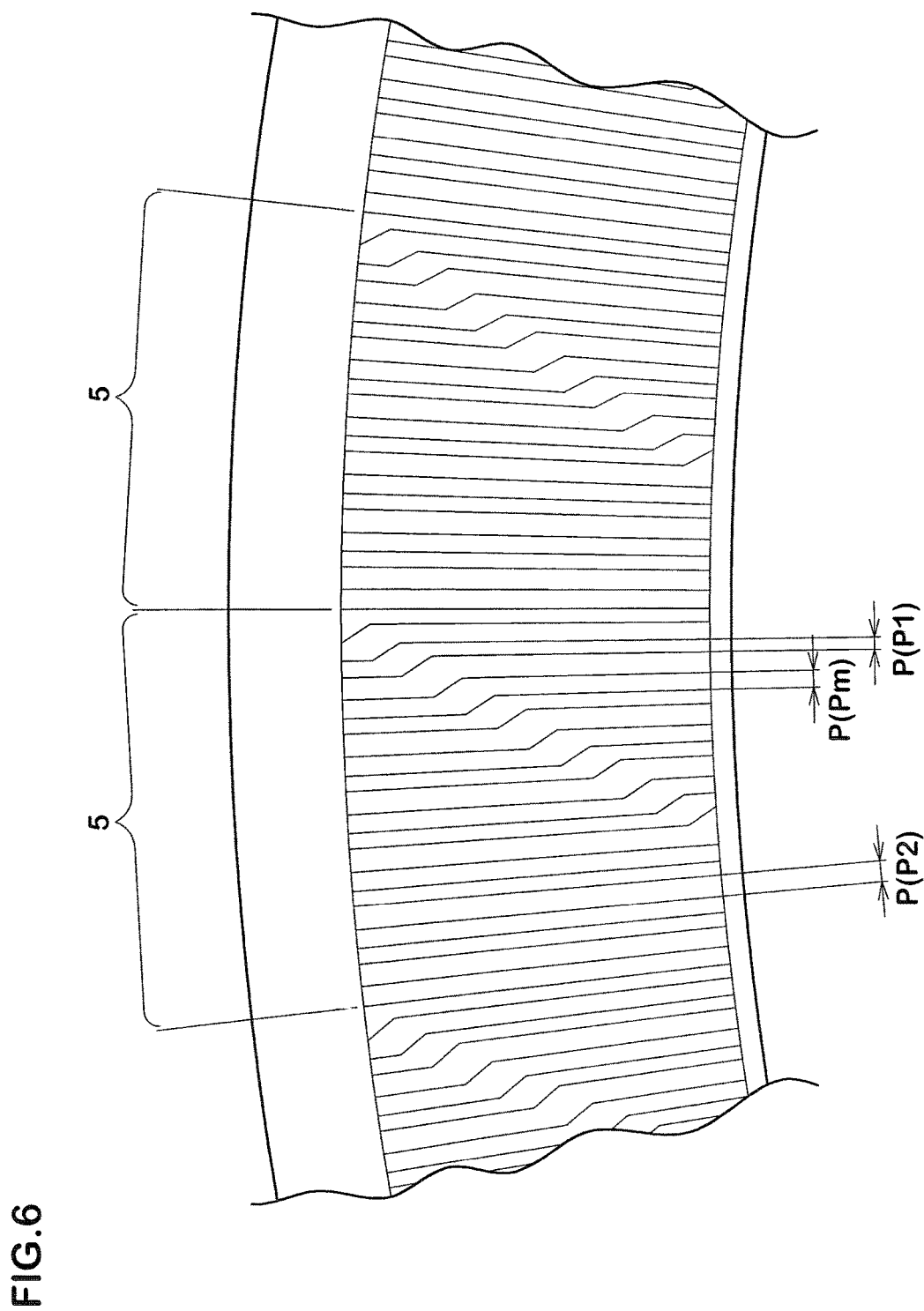
FIG. 6 shows another example of the arrangement pitch variation of the ridges in a ridge group.

In each of the ridge groups 5, the arrangement pitches P can be constant for example as shown in FIGS. 1, 4 and 7. However, as shown in FIGS. 5 and 6, the arrangement pitches P can be varied to have a minimum pitch P1 and a maximum pitch P2. The minimum pitch P1 is preferably set in a range of 0.2 to 0.3 degrees. The maximum pitch P2 is preferably set in a range of not more than 0.5 degrees. The difference (P2−P1) between the maximum pitch P2 and the minimum pitch P1 is preferably set in a range of not less than 0.1 degrees.

In this case, dark parts and light parts alternate in the circumferential direction, and the serration pattern can be further variegated, therefore, the effect to make the bulge/dent unnoticeable can be further improved in cooperation with the oblique patterns 13.

In the example shown in FIG. 5, the arrangement pitches P are the minimum pitch P1 and the maximum pitch P2 only. In the example shown in FIG. 6, the arrangement pitches P are the minimum pitch P1, the maximum pitch P2 and a middle pitch Pm. If the different pitches P are too much, the variations between the adjacent pitches P becomes small and even. As a result, the effect by the pitch variation decreases, and the contrast between the light parts and dark parts decreases, therefore, the effect to make the bulge/dent unnoticeable can not be improved thereby. Therefore, it is preferable that the number of the different pitches P is 2 or 3.

Figure 8:
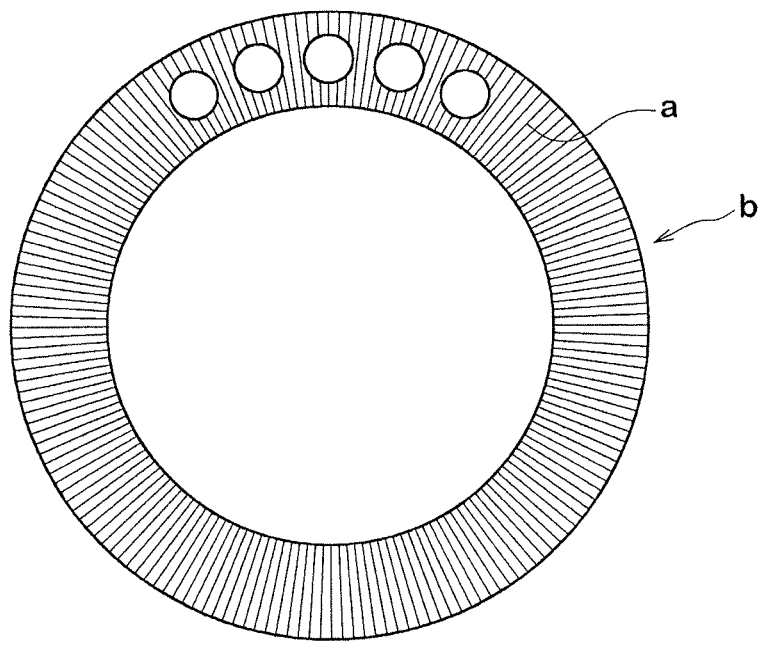
FIG. 8 shows a tire sidewall portion showing a conventional serrated area.

In the drawings, especially in FIGS. 1, 4, 5, 6 and 7, marks are not illustrated in the serrated areas 3, but, needless to say, one or more marks (brand name, decorative pattern and the like as indicated in FIG. 8 by using white circles) can be formed in the serrated area 3 as a background of the mark(s).

Comparison Tests

Pneumatic tires of size 195/65R15 were experimentally manufactured.

The sidewall portions of each tire were provided with serrated areas whose specifications are shown in Table 1.

Excepting the specifications shown in Table 1, all the test tires had the same specifications, and the cross-sectional shapes of the ridges were an isosceles triangle having an apex angle γ of 60 degrees and a protruding height Hr of 0.4 mm.

The test tires were inflated to 230 kPa and tested. In the tests, a bulge/dent occurring in the sidewall portions was visually observed and evaluated. Further, the visibility of marks formed in the serrated areas was visually evaluated. The evaluation results are indicated in Table 1 by an index based on comparative example 3 being 100, wherein the larger the value, the better the result.

TABLE 1

|  | Tire | | | | | | | | | | | |
|---|---|---|---|---|---|---|---|---|---|---|---|---|
|  | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 |
| ridge length direction (*1) | 80 | 90 | 90 | 80 | 90 | 90 | 90 | 90 | 90 | 90 | 90 | 90 |
| ridge configuration | straight | arc (R100) | straight | straight | straight | straight | straight | straight | straight | straight | straight | straight |
| ridge groups | non | non | non |  |  |  |  |  |  |  |  |  |
| first ridge |  |  |  |  |  |  |  |  |  |  |  |  |
| number (na) | — | — | — | 6 | 6 | 1 | 15 | 6 | 6 | 15 | 6 | 6 |
| second ridge |  |  |  |  |  |  |  |  |  |  |  |  |
| type | — | — | — | bent | bent | bent | bent | bent | bent | bent | bent | bent |
| number (nb) | — | — | — | 12 | 12 | 12 | 12 | 25 | 5 | 5 | 12 | 26 |
| angular distance α (deg.) | — | — | — | 0.1 | 0.1 | 0.1 | 0.1 | 0.1 | 0.1 | 0.1 | 0.5 | 0.1 |
| angular distance θ (deg.) | — | — | — | 2.3 | 2.3 | 2.3 | 2.3 | 4.9 | 0.9 | 0.9 | 2.7 | 5.1 |
| arrangement pitches P |  |  |  |  |  |  |  |  |  |  |  |  |
| number of different pitches P | 1 | 1 | 1 | 1 | 1 | 1 | 1 | 1 | 1 | 1 | 1 | 1 |
| minimum pitch P1 (deg.) | 0.2 | 0.2 | 0.2 | 0.2 | 0.2 | 0.2 | 0.2 | 0.2 | 0.2 | 0.2 | 0.2 | 0.2 |
| maximum pitch P2 (deg.) | 0.2 | 0.2 | 0.2 | 0.2 | 0.2 | 0.2 | 0.2 | 0.2 | 0.2 | 0.2 | 0.2 | 0.2 |
| bulge/dent | 95 | 95 | 100 | 100 | 105 | 105 | 103 | 103 | 103 | 101 | 105 | 102 |
| visibility of mark | 100 | 100 | 100 | 100 | 100 | 100 | 100 | 100 | 100 | 100 | 95 | 100 |

|  | Tire | | | | | |
|---|---|---|---|---|---|---|
|  | Ex. 9 | Ex. 10 | Ex. 11 | Ex. 11 | Ex. 12 | Ex. 13 |
| ridge length direction (*1) | 90 | 90 | 90 | 90 | 90 | 90 |
| ridge configuration | straight | straight | straight | straight | straight | straight |
| ridge groups |  |  |  |  |  |  |
| first ridge |  |  |  |  |  |  |
| number (na) | 6 | 6 | 6 | 6 | 6 | 6 |
| second ridge |  |  |  |  |  |  |
| type | bent | bent | bent | bent | bent | interrupt |
| number (nb) | 12 | 12 | 12 | 12 | 12 | 12 |
| angular distance α (deg.) | 0.1 | 0.1 | 0.1 | 0.1 | 0.1 | — |
| angular distance θ (deg.) | 5.6 | 4.4 | 5.0 | 4.7 | 5.4 | 2.2 |
| arrangement pitches P |  |  |  |  |  |  |
| number of different pitches P | 1 | 3 (*2) | 2 (*3) | 3 (*4) | 3 (*5) | 1 |
| minimum pitch P1 (deg.) | 0.5 | 0.3 | 0.4 | 0.3 | 0.4 | 0.2 |

TABLE 1-continued

| | | | | | | |
|---|---|---|---|---|---|---|
| maximum pitch P2 (deg.) | 0.5 | 0.5 | 0.5 | 0.6 | 0.6 | 0.2 |
| bulge/dent | 105 | 110 | 108 | 110 | 106 | 103 |
| visibility of mark | 93 | 100 | 95 | 95 | 90 | 100 |

(*1) the angle in degrees with respect to the tire circumferential direction
(*2) 0.3, 0.4 and 0.5 deg. were repeated in this order
(*3) 0.4 and 0.5 deg. were repeated in this order
(*4) 0.3, 0.4 and 0.6 deg. were repeated in this order
(*5) 0.4, 0.5 and 0.6 deg. were repeated in this order

The invention claimed is:

1. A pneumatic tire comprising
a sidewall portion provided in the outer surface thereof with a serrated area,
the serrated area being formed continuously in the tire circumferential direction with a constant radial width, and having a radially inner border and a radially outer border,
the serrated area being defined by radially-extending circumferentially-arranged ridges, wherein
the serrated area has circumferentially-arranged groups each including:
one first ridge or a plurality of first ridges circumferentially arranged side-by-side, each being straight over the entire length; and a plurality of second ridges, circumferentially arranged side-by-side, and each is provided with an irregular part and otherwise being straight, wherein the first ridge or ridges and the second ridges each extend from the radially inner border to the radially outer border, and
in each of the ridge groups, the irregular parts of the second ridges are gradually radially shifted so that the irregular parts are arranged along a line inclined with respect to a tire radial direction, and the irregular parts form an oblique pattern in the ridge group, wherein said oblique pattern substantially extends straight from the radially inner border to the radially outer border with a substantially constant width, and
wherein
the irregular part of each of the second ridges is a bent part of the continuous second ridge, and
in each of the ridge groups, the bent parts as the irregular parts intersect said line so that the bent parts are inclined in the same direction.

2. The pneumatic tire according to claim 1, wherein
each of the second ridges is made up of the bent part, a radially inner part on the radially inside of the bent part, and a radially outer part on the radially outside of the bent part, and has a Z-shaped configuration, and
the angular distance α between the radially inner part and the radially outer part around the tire rotational axis is not more than 0.5 degrees.

3. The pneumatic tire according to claim 2, wherein,
in each of the ridge groups, the number of the first ridge(s) is 1 to 15, and the number of the second ridges is 5 to 25.

4. The pneumatic tire according to claim 2, wherein,
in each of the ridge groups, the angular distance θ between the circumferentially outermost two of the second ridges around the tire rotational axis is not more than 5 degrees.

5. The pneumatic tire according to claim 2, wherein,
in each of the ridge groups, arrangement pitches of the ridges are in a range of 0.2 to 0.5 degrees when expressed by angular pitches around the tire rotational axis.

6. The pneumatic tire according to claim 1, wherein,
in each of the ridge groups, arrangement pitches of the ridges are constant.

7. The pneumatic tire according to claim 1, wherein,
in each of the ridge groups, arrangement pitches of the ridges include a minimum pitch of from 0.2 to 0.3 degrees, and a maximum pitch of not more than 0.5 degrees, when expressed by angular pitches around the tire rotational axis.

8. The pneumatic tire according to claim 1, wherein,
in each of the ridge groups, the number of the first ridge(s) is 1 to 15, and the number of the second ridges is 5 to 25.

9. The pneumatic tire according to claim 1, wherein,
in each of the ridge groups, the angular distance θ between the circumferentially outermost two of the second ridges around the tire rotational axis is not more than 5 degrees.

10. The pneumatic tire according to claim 1, wherein,
in each of the ridge groups, arrangement pitches of the ridges are in a range of 0.2 to 0.5 degrees when expressed by angular pitches around the tire rotational axis.

11. The pneumatic tire according to claim 1, wherein
the oblique patterns in the serrated area are inclined to one circumferential direction toward the radially outside from the radially inside of the tire.

12. The pneumatic tire according to claim 11, wherein
the ridge groups are successively arranged in the tire circumferential direction.

13. The pneumatic tire according to claim 1, wherein
the oblique patterns in the serrated area are inclined to alternate one circumferential direction and the other circumferential direction toward the radially outside from the radially inside of the tire.

* * * * *